(12) United States Patent
Lee et al.

(10) Patent No.: US 10,074,488 B2
(45) Date of Patent: Sep. 11, 2018

(54) EXTERNAL TERMINAL, HAVING STRUCTURE FOR PREVENTING LEAKAGE OF ELECTROLYTE, FOR ELECTRIC ENERGY STORAGE DEVICE

(71) Applicant: LS Mtron Ltd., Anyang-si, Gyeonggi-do (KR)

(72) Inventors: Ha-Young Lee, Suwon-si (KR); Heui-Soo Kim, Yongin-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/543,681

(22) PCT Filed: Jan. 14, 2016

(86) PCT No.: PCT/KR2016/000400
§ 371 (c)(1),
(2) Date: Jul. 14, 2017

(87) PCT Pub. No.: WO2016/114603
PCT Pub. Date: Jul. 21, 2016

(65) Prior Publication Data
US 2017/0372844 A1    Dec. 28, 2017

(30) Foreign Application Priority Data
Jan. 15, 2015  (KR) .................. 10-2015-0007509

(51) Int. Cl.
*H01G 9/10*   (2006.01)
*H01G 9/04*   (2006.01)
*H01G 9/035*  (2006.01)

(52) U.S. Cl.
CPC .............. *H01G 9/10* (2013.01); *H01G 9/035* (2013.01); *H01G 9/04* (2013.01)

(58) Field of Classification Search
None
See application file for complete search history.

(56) References Cited

U.S. PATENT DOCUMENTS

| 3,243,673 | A | * | 3/1966 | Leach | H01G 4/04 |
| | | | | | 174/12 R |
| 3,597,663 | A | * | 8/1971 | Markarian | H01G 9/10 |
| | | | | | 174/564 |

(Continued)

FOREIGN PATENT DOCUMENTS

| EP | 2 980 818 A1 | 2/2016 |
| JP | 2000-150324 A | 5/2000 |

(Continued)

OTHER PUBLICATIONS

Search Report, dated Apr. 25, 2016, for International Application No. PCT/KR2016/000400.

(Continued)

*Primary Examiner* — Dion R Ferguson
(74) *Attorney, Agent, or Firm* — K&L Gates LLP

(57) ABSTRACT

An external terminal for an electric energy storage device, which is coupled to an upper end of a cylindrical metal case to cap the metal case and has a hollow formed at a center thereof so that a safety valve is installed therein, wherein the metal case includes an outer part exposed to the outside in an erect state in a normal direction and an inner part positioned below the outer part, and wherein the inner part includes a first surface adjacent to the hollow and a second surface stepped higher than the first surface (112a) toward the outer part (111).

7 Claims, 6 Drawing Sheets

(56) References Cited

U.S. PATENT DOCUMENTS

| | | | |
|---|---|---|---|
| 4,992,910 A * | 2/1991 | Evans | H01G 9/12 |
| | | | 361/502 |
| 6,316,720 B1 | 11/2001 | Matsumoto et al. | |
| 7,365,962 B2 * | 4/2008 | Miura | H01G 9/04 |
| | | | 361/301.1 |
| 7,817,404 B2 | 10/2010 | Miura et al. | |
| 8,098,481 B2 * | 1/2012 | Zong | H01G 9/008 |
| | | | 361/502 |
| 8,537,526 B2 * | 9/2013 | Shimizu | H01G 9/10 |
| | | | 361/502 |
| 9,490,079 B2 * | 11/2016 | So | H01G 11/04 |
| 9,805,877 B2 * | 10/2017 | Khakhalev | H01G 9/048 |
| 2009/0052115 A1 * | 2/2009 | Miura | H01G 9/008 |
| | | | 361/500 |
| 2009/0086411 A1 * | 4/2009 | Miura | H01G 9/10 |
| | | | 361/521 |
| 2009/0122468 A1 * | 5/2009 | Miura | H01G 9/10 |
| | | | 361/518 |
| 2011/0236733 A1 | 9/2011 | Lee et al. | |
| 2012/0229954 A1 * | 9/2012 | Lee | B23K 26/0823 |
| | | | 361/502 |
| 2016/0009345 A1 | 3/2016 | Kuroki et al. | |
| 2017/0372849 A1 * | 12/2017 | Lee | H01G 11/26 |

FOREIGN PATENT DOCUMENTS

| | | |
|---|---|---|
| JP | 2001060534 A | 3/2001 |
| JP | 2012069644 A | 4/2012 |
| JP | 2014209524 A | 11/2014 |
| JP | 2014209529 A | 11/2014 |
| KR | 20-0379910 Y1 | 3/2005 |
| KR | 10-2008-0002804 A | 1/2008 |
| KR | 10-2008-0009462 A | 1/2008 |
| KR | 10-1058515 B1 | 8/2011 |
| KR | 101159652 B1 | 6/2012 |
| KR | 10-1345224 B1 | 12/2013 |
| KR | 10-2014-0075263 A | 6/2014 |
| KR | 10-2015-0096045 A | 8/2015 |
| WO | 2013/051273 A | 4/2013 |
| WO | 2014/199639 A1 | 12/2014 |

OTHER PUBLICATIONS

Written Opinion, dated Apr. 25, 2016, for International Application No. PCT/KR2016/000400.

* cited by examiner

EXTERNAL TERMINAL, HAVING STRUCTURE FOR PREVENTING LEAKAGE OF ELECTROLYTE, FOR ELECTRIC ENERGY STORAGE DEVICE

CROSS-REFERENCE TO RELATED APPLICATION(S)

The present application is a U.S. National Phase entry from International Application No. PCT/KR2016/000400, filed Jan. 14, 2016, which claims priority to Korean Patent Application No. 10-2015-0007509, filed Jan. 15, 2015, the disclosure of which is incorporated by reference herein in its entirety.

BACKGROUND OF THE INVENTION

1. Field of the Invention

The present disclosure relates to an external terminal for an electric energy storage device, and more particularly, to an external terminal, having a structure for preventing leakage of an electrolyte, for an electric energy storage device.

2. Description of Related Art

A high capacitance storage device, which is regarded as a next-generation electric energy storage device, includes a ultra-capacitor (UC), a super capacitor (SC), an electric double layer capacitor (EDLC) and the like, which are a kind of capacitor, and it is an energy storage device having an intermediate property between an electrolytic condenser and a secondary battery, which can be used in combination with, or in place of, a secondary battery due to its high efficiency and semi-permanent life span.

The high capacitance storage device is sometimes used in place of a battery for applications which do not ensure easy maintenance and demand long service life. The high capacitance storage device has fast charging/discharging characteristics and thus is very suitable not only as an auxiliary power source for mobile communication information devices such as a mobile phone, a notebook and a PDA but also as a main or auxiliary power source of an electric vehicle, a night road pilot lamp, an uninterrupted power supply (UPS) and the like, which demand high capacity, and is widely used for such purposes.

The high capacitance storage device generally has a cylindrical shape as shown in FIG. 1 for a small size.

Referring to FIG. 1, a high capacitance storage device includes an inner housing 10 containing a positive electrode, a negative electrode, a separator and an electrolyte, a metal case 40 accommodating the inner housing 10, and an upper internal terminal 20 and a lower internal terminal 30 respectively connected to upper and lower portions of the metal case 40 and connected to a negative electrode and a positive electrode of a cell assembly.

The upper inner terminal 20 is insulated against the metal case 40 by an insulation member 60 and simultaneously contacts a top plate 50, and the lower inner terminal 30 is in contact with the metal case 40. Here, terminal units 51, 55 are generally formed to protrude at a center of the top plate 50 and a bottom center of the metal case 40.

The coupling between the upper internal terminal 20 and the top plate 50 and the coupling between the lower internal terminal 30 and the metal case 40 are usually made by a coupling bolt 70. Here, particularly, the top plate 50 is heavy and bulky, which demands structural improvements.

In a high capacitance storage device, a side reaction occurs at an interface between an electrolyte and an electrode when an abnormal operation such as overcharge, overdischarge and overvoltage takes place at room temperature, thereby generating gas as a byproduct. If the gas is generated and accumulated inside, the internal pressure of the metal case 40 continuously increases, and eventually the metal case 40 is swelled convexly or gas is discharged abruptly at a weak portion of the metal case 40 to cause explosion.

In relation to the swelling phenomenon of the metal case 40, a curling portion 45 bent toward the top plate 50 is formed at the upper end of the metal case 40 so that the pressure resistance performance may be easily enhanced by controlling the curling amount.

Meanwhile, when the existing high capacitance storage device is placed in a vertically reverse state or in a tilted state during handling, a liquid electrolyte remaining therein moves toward the safety valve, and if the safety valve is opened, the liquid electrolyte is leaked outwards. Thus, countermeasures against this problem are needed.

SUMMARY OF THE INVENTION

The present disclosure is designed to solve the problems of the related art, and therefore the present disclosure is directed to providing an external terminal for an electric energy storage device, which has an accommodating structure for preventing a residual electrolyte from flowing toward a safety valve when the external terminal is placed in a reverse or tilted state.

The present disclosure is also directed to providing an external terminal for an electric energy storage device, which has an improved structure to allow a lighter design.

In one aspect of the present disclosure, there is provided an external terminal for an electric energy storage device, which is coupled to an upper end of a cylindrical metal case to cap the metal case and has a hollow formed at a center thereof so that a safety valve is installed therein, wherein the metal case includes an outer part exposed to the outside in an erect state in a normal direction and an inner part positioned below the outer part, and wherein the inner part includes a first surface adjacent to the hollow and a second surface stepped higher than the first surface 112a toward the outer part 111.

The outer part and the inner part may be integrated to form a single body.

The single body may have a circular outer circumference, and a beading groove for beading the metal case may be formed at the outer circumferential surface of the single body.

The second surface may be formed with a circular shape based on the hollow.

The inner part may have a step by which a third surface thereof centered on the second surface is higher than the first surface and lower than the second surface toward the outer part.

A width W2 of the third surface may be relatively greater than a width W1 of the second surface.

A thickness T1 corresponding to a step depth of the second surface and a thickness T2 corresponding to a step depth of the third surface may be 30 to 80% with respect to a maximum thickness Tm of a plate-shaped body.

Advantageous Effects

According to the present disclosure, when the electric energy storage device is placed in a reverse or tilted state, the residual electrolyte may be prevented from flowing out to the safety valve by staying in an accommodation space formed in the external terminal.

In addition, since an internal terminal is connected to a lower portion of the external terminal and the external terminal is fixed to the metal case by means of beading, the product may have a light design.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE INVENTION

Figure 1:
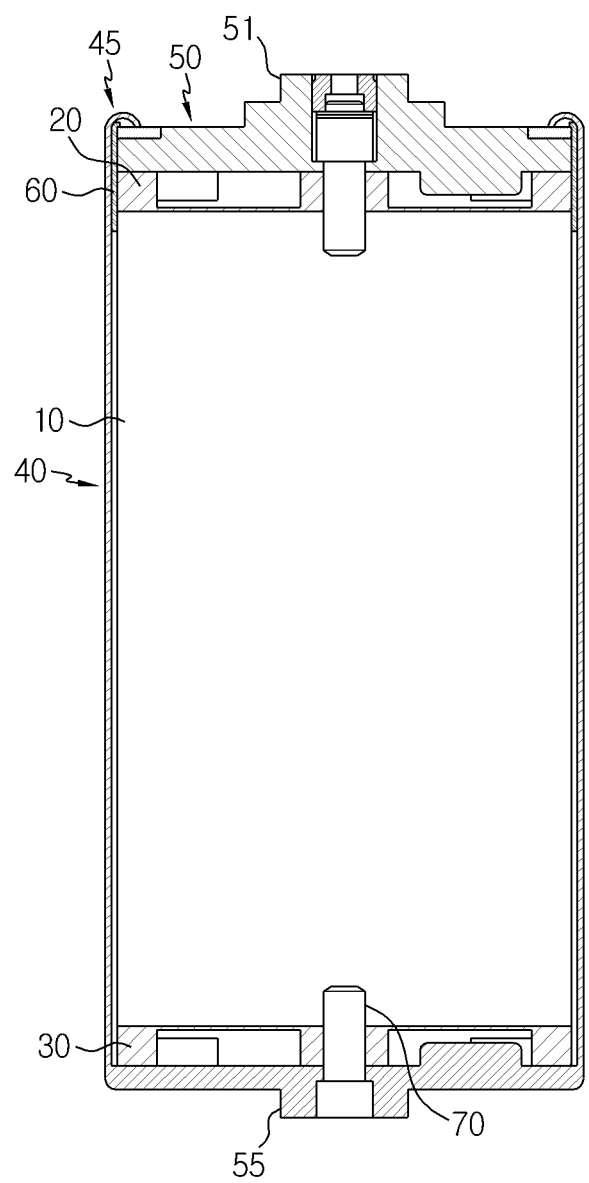
FIG. 1 is a cross-sectional view showing an electric energy storage device of an existing technique.
Figure 2:
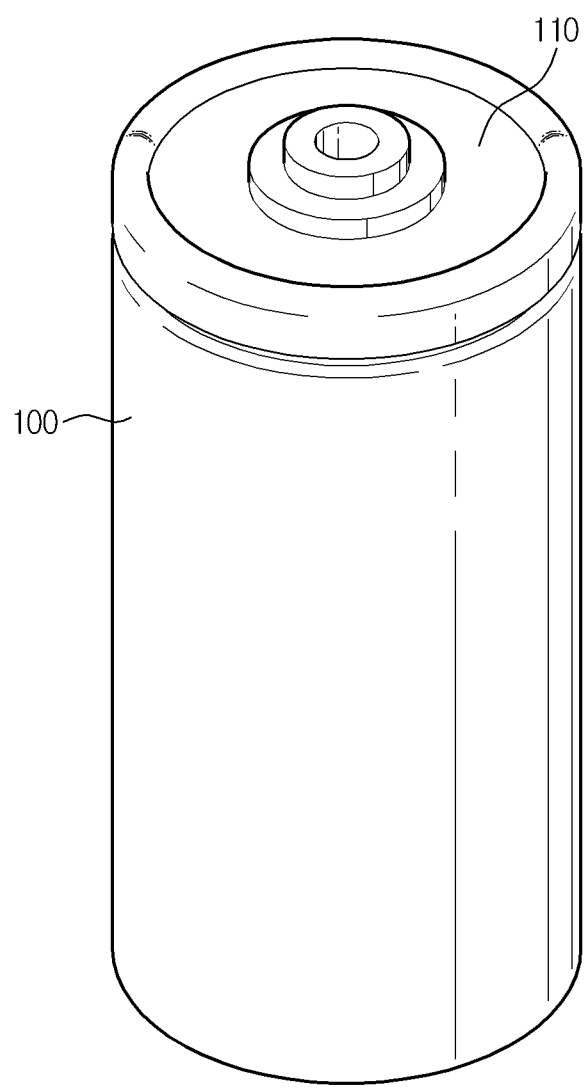
FIG. 2 is a perspective view showing an appearance of an electric energy storage device according to an embodiment of the present disclosure.
Figure 3:
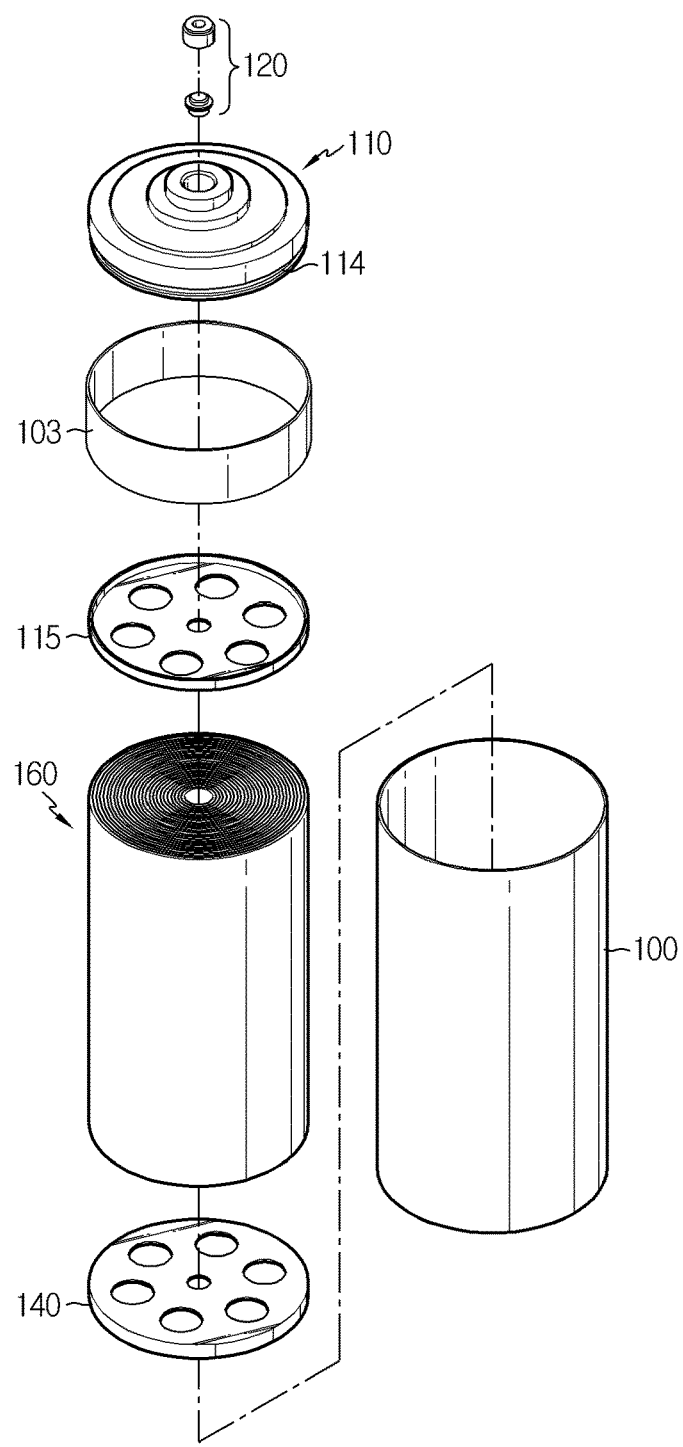
FIG. 3 is an exploded perspective view of FIG. 2, before beading and curling are performed.
Figure 4:
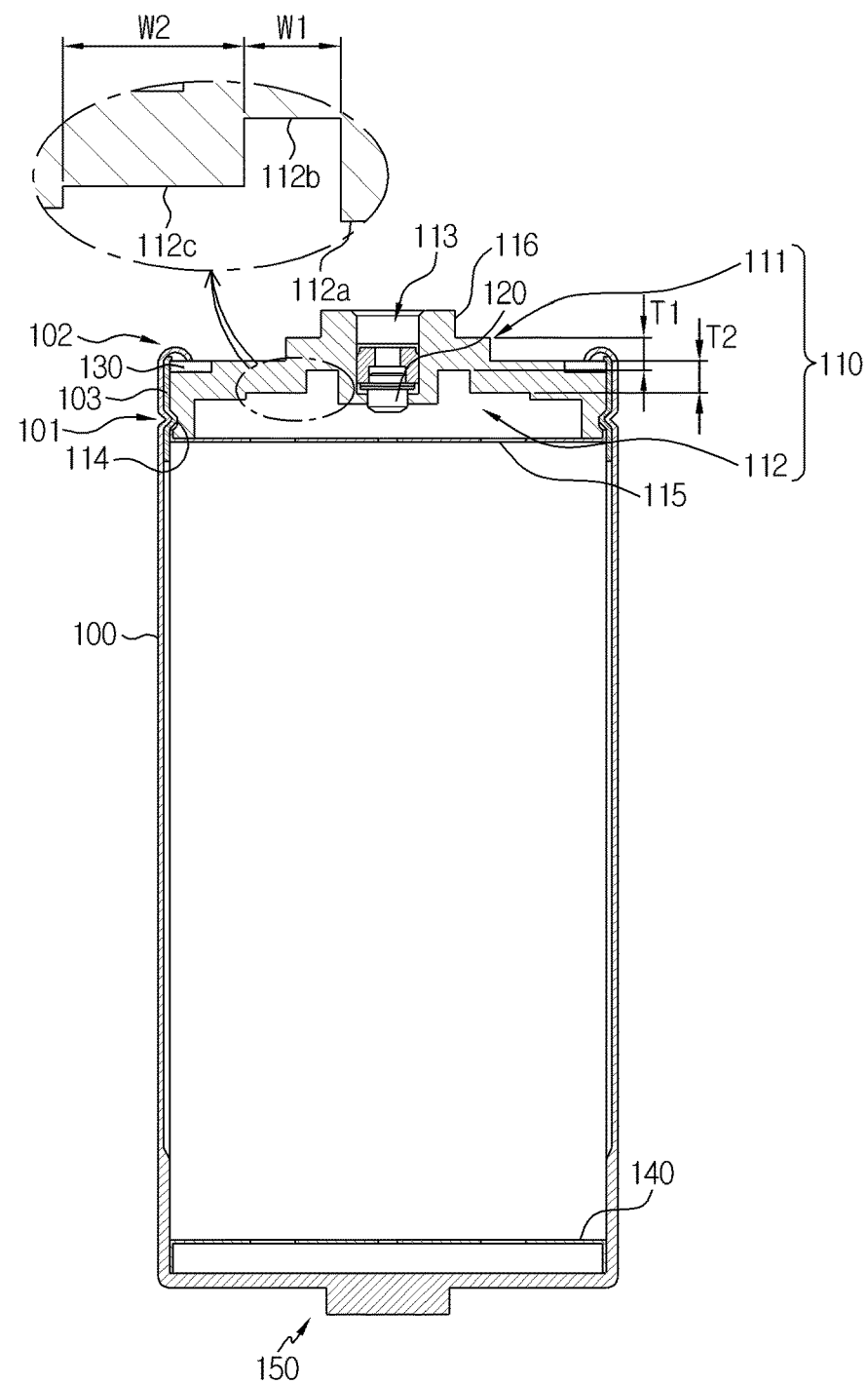
FIG. 4 is a cross-sectional view of FIG. 2.

FIG. 2 is a perspective view showing an appearance of an electric energy storage device according to an embodiment of the present disclosure, FIG. 3 is an exploded perspective view of FIG. 2, and FIG. 4 is a cross-sectional view an assembled state of FIG. 2.

Referring to FIGS. 2 to 4, an electric energy storage device according to an embodiment of the present disclosure includes a cell assembly 160, a cylindrical metal case 100 accommodating the cell assembly 160 and an electrolyte, and an upper terminal 110 connected to a negative electrode of the cell assembly 160 to cap an upper end of the metal case 100 and configured to prevent a residual electrolyte from flowing toward a safety valve.

As the cell assembly 160, an existing bare cell for an ultra-capacitor in which a positive electrode and a negative electrode are wound together with a separator into the form of a jelly roll may be employed.

The metal case 100 includes a cylindrical body having an inner space capable of accommodating the cell assembly 160 contained in a predetermined inner housing. Preferably, the metal case 100 may be provided using an aluminum cylinder.

Based on a state where the metal case 100 is erect, the upper external terminal 110 and the lower external terminal 150 respectively corresponding to the negative electrode and the positive electrode of the cell assembly 160 are disposed at both ends of the metal case 100 in a longitudinal direction. Also, a first internal terminal 115 is interposed between the negative electrode and the upper external terminal 110 and connected to the negative electrode, and a second internal terminal 140 is interposed between the positive electrode and the lower external terminal 150 and connected to the positive electrode.

The first internal terminal 115 has a plate-shaped body having a plurality of electrolyte impregnation holes, and is tightly coupled to a lower edge of the upper external terminal 110 and integrated thereto.

An end of the metal case 100 at a side where the second internal terminal 140 and the lower external terminal 150 are located is closed by a bottom portion of the case which is integrally connected to side portions of the case.

A curling portion 102 may be provided at an upper end of the metal case 100 near the upper external terminal 110, and the curling portion 102 is bent inward to prevent the upper external terminal 110 from being deviated. The pressure resistance performance at the side of the metal case 100 located near the upper external terminal 110 may be easily controlled by adjusting a curling amount of the curling portion 102.

The upper external terminal 110 caps the upper end of the metal case 100 and gives a current path. The upper external terminal 110 has a circular outer circumferential surface corresponding to the inner circumferential surface of the metal case 100, and its overall shape may be configured with various three-dimensional forms. The edge of the upper external terminal 110 is adjacent to the curling portion 102 with an insulating member 130 being interposed therebetween. In addition, the side of the upper external terminal 110 is insulated against the metal case 100 by the insulating member 103.

A hollow 113 extending in a thickness direction is formed at the center of the upper external terminal 110. The hollow 113 is used, for example, as a space for installing an automatic reset safety valve 120 as well as a path for injecting an electrolyte and an air vent for vacuum operation.

The upper external terminal 110 may be fixed to the metal case 100 by means of a beading process performed to the metal case 100. For firm fixation, around the outer circumferential surface of the upper external terminal 110, a beading groove 114 for forming a beading portion 101 is provided at the inner surface of the metal case 100. As a modification, the beading groove 114 may also be formed only in a partial region of the outer circumferential surface of the upper external terminal 110. As described above, since the upper external terminal 110 is prevented from being deviated by the curling portion 102, the upper external terminal 110 may be fixed to the metal case 100 even though the beading groove 114 is formed only in a partial region. In this case, the structure of the upper external terminal 110 may be further simplified, and also the forging process may be easily applied in manufacturing the upper terminal 100.

The upper external terminal 110 includes an outer part 111, which is a portion exposed to the outside when the metal case 100 is placed in a normal direction, and an inner part 112, which is positioned below the outer part 111. Here, the 'normal direction' refers to a direction in which the metal case 100 is placed to be erect so that the safety valve 120 is positioned at the upper end of the metal case 100.

Preferably, the upper external terminal 110 is composed of a single body to simplify the structure, and the outer body 111 and the inner body 112 are provided on the single body. Specifically, the outer part 111 corresponds to the upper surface of the upper external terminal 110 composed of a single body, and the inner part 112 corresponds to the lower surface of the upper external terminal 110.

Figure 5:
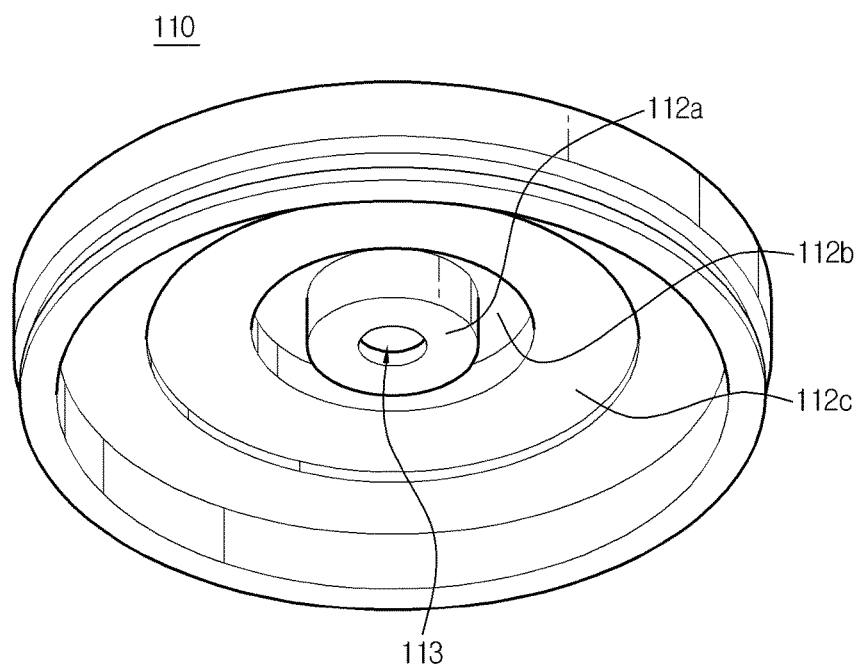
FIG. 5 is a perspective view showing an appearance of an upper terminal, depicted in FIG. 4.

As shown in FIG. 5, the inner part 112 of the upper external terminal 110 includes a first surface 112a adjacent to the hollow 113, and a second surface 112b provided out of the first surface 112a and stepped higher than the first surface 112a toward the outer part 111. If the second surface 112b is stepped higher than the first surface 112a toward the outer part 111, a concave portion configured to collect the remaining electrolyte when the metal case 100 is placed in a reverse or tilted state is forms, and thus leakage of the electrolyte through the hollow 113 is prevented. The remaining electrolyte may be a residual electrolyte that is not absorbed into the electrode during the electrolyte injection. In addition, in a certain condition (−40 to 65° C., 0 to 2.7 V), generally, there is no abnormality in the impregnation state of the electrolyte, but if a certain condition is deficient or excessive, the electrolyte absorbed in the electrode may flow out and be added to the remaining electrolyte.

The second surface 112b is formed in a circular pattern to be substantially concentric with the outer circumference of the upper external terminal 110 about the hollow 113. According to this configuration, when the metal case 100 is placed in a reverse or tilted state, the flow of the electrolyte remaining in the entire surface area of the inner part 112 may be guided to the concave portion and accommodated therein.

A third surface 112c stepped lower than the second surface 112b toward the outer part 111 may be added to the outside of the second surface 112b. At this time, the third surface 112c should be stepped higher than the first surface 112a toward the outer part 111 in order to prevent the leakage. In other words, the third surface 112c has a step between the first surface 112a and the second surface 112b. With this configuration, it is possible to accomplish two objects. First, the rigidity of the external terminal itself may be secured to prevent deformation or damage due to external force. The outer part 111 is configured so that its center is highest and its other portions are lowered step by step as being farther from the center. Here, if the concave portion of the inner part 112 is formed too wide by the second surface 112b, the external terminal has a small thickness, which may be weak against external impact. The third surface 112c may prevent the thickness of the external terminal from becoming too small. Second, the residual electrolyte may be further prevented from flowing into the safety valve. In other words, even though the amount of the electrolyte is so great not to be accommodated in the concave portion formed by the first surface 112a and the second surface 112c, it is possible to prevent the electrolyte from flowing into the safety valve by guiding the electrolyte to flow in a direction opposite to the hollow 113.

It is preferable that a width W2 of the third surface 112c is relatively larger than a width W1 of the second surface 112b so as to secure the accommodation space for the residual electrolyte as much as possible.

Figure 6:
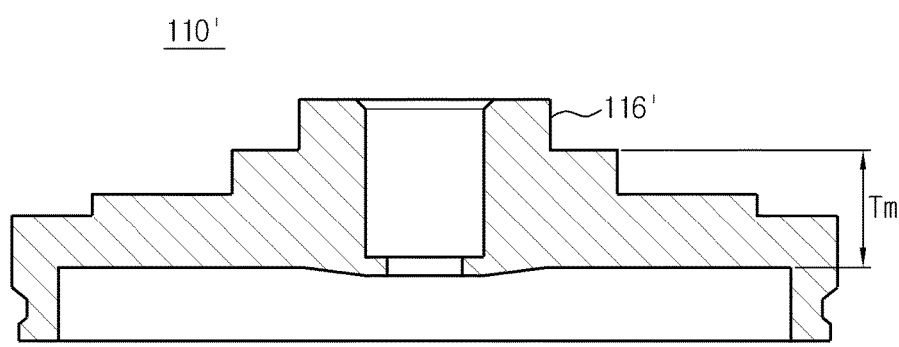
FIG. 6 is a cross-sectional view showing a structure where a step is not formed at the upper terminal according to a comparative example.

In the upper external terminal 110, a thickness T1 corresponding to the step depth of the second surface 112b and a thickness T2 corresponding to the step depth of the third surface 112c may be optimized in consideration of a maximum thickness Tm of the plate-shaped body of the upper terminal 110 and the strength of the upper terminal 110. Specifically, the thickness T1 corresponding to the step depth of the second surface 112b and the thickness T2 corresponding to the step depth of the third surface 112c may be within the range of 30 to 80% of the maximum thickness Tm of the plate-shaped body of an upper terminal 110' in which a step is not formed at the lower surface, as shown in FIG. 6. Here, the plate-shaped body refers to a portion of the upper terminal 110' except an upper terminal unit 116' protruding from the center thereof, and may have a planar shape or various three-dimensional shapes.

If the thickness T1 corresponding to the step depth of the second surface 112b and the thickness T2 corresponding to the step depth of the third surface 112c are less than 30% which is the lower limit of the numerical range, the upper end terminal 110 is easily bent and deformed. If the thicknesses exceed 80% which is the upper limit of the numerical range, a space sufficient for collecting the electrolyte is not secured.

Figure 7:
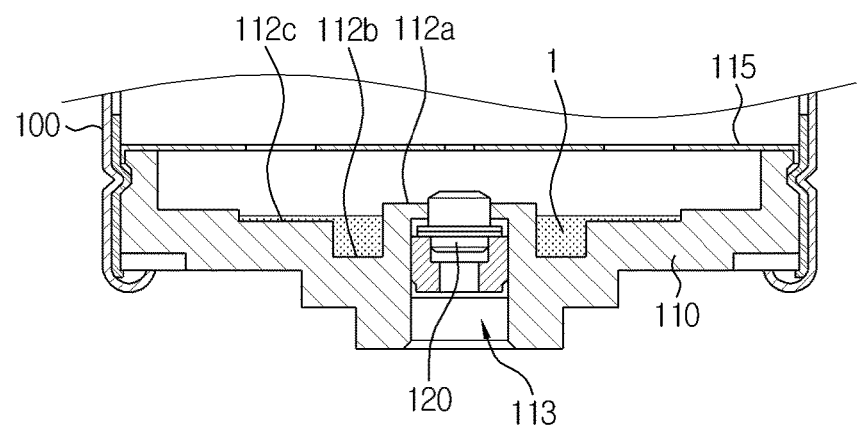
FIG. 7 is a partial sectional view showing an operation of a leakage preventing structure provided at the electric energy storage device according to an embodiment of the present disclosure.
Figure 8:
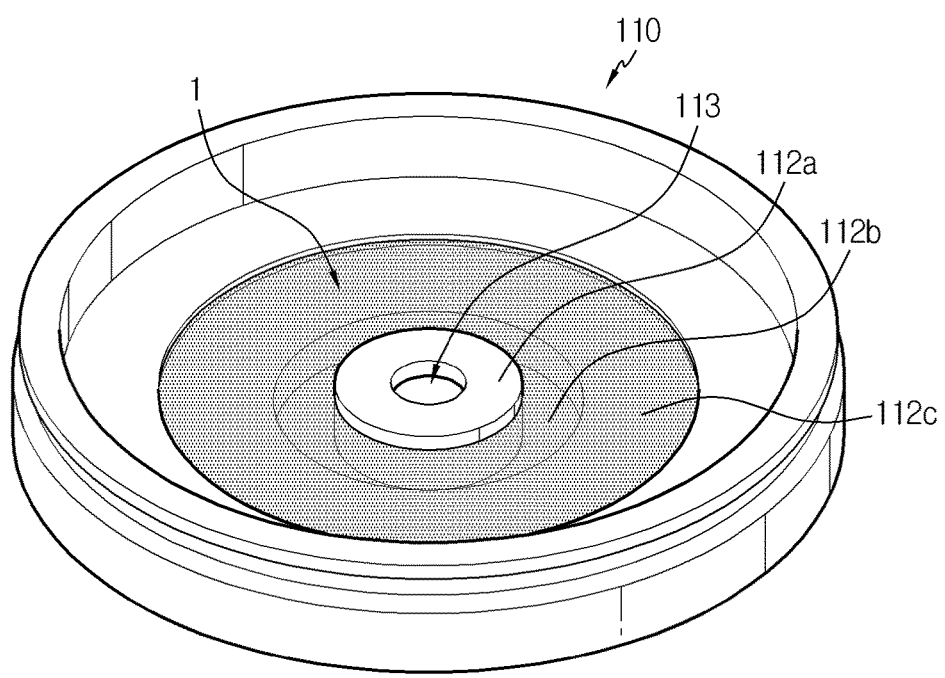
FIG. 8 is a partial perspective view of FIG. 7.

FIGS. 7 and 8 show an operation of a non-leakage structure provided at the electric energy storage device according to an embodiment of the present disclosure. As shown in FIGS. 7 and 8, when the electric energy storage device is placed in a reverse direction, at the inner part 112 of the upper terminal 110, a liquid electrolyte is collected in the concave portion formed by the second surface 112b or the third surface 112c stepped relatively higher than the first surface 112a toward the outer part 111. Thus, even though the safety valve 120 is in an open state, the electrolyte does not flow over the threshold of the first surface 112a, thereby preventing the leakage through the hollow 113. This effect may be obtained identically even when the electric energy storage device is placed in a titled state.

As described above, even though the electric energy storage device according to the embodiment of the present disclosure is placed in a reverse or tilted state, the residual electrolyte is collected in the concave portion formed at the inner part 112 of the upper external terminal 110 and thus is prevented from flowing to the safety valve 120. In addition, since the structure of the first internal terminal 115 may have a thin design by means of the beading groove 114 formed at the outer circumferential surface of the upper external terminal 110, it is possible to reduce the size and weight of the first internal terminal 115 and sufficiently secure the internal space of the metal case 100.

Although the present disclosure has been described by way of the limited embodiments and drawings, the present disclosure is not limited thereto, and it will be understood by those skilled in the art that various modifications and changes can be made without departing from the scope of the appended claims.

INDUSTRIAL APPLICABILITY

If the present disclosure is applied, it is possible to reduce the weight of a product and increase the inner space of the metal case, so that the internal pressure may be lowered to improve the stability and the life.

What is claimed is:

1. An external terminal for an electric energy storage device, which is coupled to an upper end of a cylindrical metal case to cap the metal case and has a hollow formed at a center thereof so that a safety valve is installed therein,
   wherein the metal case includes an outer part exposed to the outside in an erect state in a normal direction and an inner part positioned below the outer part, and
   wherein the inner part includes a first surface adjacent to the hollow and a second surface stepped higher than the first surface toward the outer part.

2. The external terminal for an electric energy storage device according to claim 1,
   wherein the outer part and the inner part are integrated to form a single body.

3. The external terminal for an electric energy storage device according to claim 2, wherein the single body has a circular outer circumference, and wherein a beading groove for beading the metal case is formed at the outer circumferential surface of the single body.

4. The external terminal for an electric energy storage device according to claim 1, wherein the second surface is formed with a circular shape based on the hollow.

5. The external terminal for an electric energy storage device according to claim 4, wherein the inner part has a step by which a third surface thereof centered on the second surface is higher than the first surface and lower than the second surface toward the outer part.

6. The external terminal for an electric energy storage device according to claim 5, wherein a width (W2) of the third surface is relatively greater than a width (W1) of the second surface.

7. The external terminal for an electric energy storage device according to claim 5, wherein a thickness (T1) corresponding to a step depth of the second surface and a thickness (T1) corresponding to a step depth of the third surface are 30 to 80% with respect to a maximum thickness (Tm) of a plate-shaped body.

* * * * *